(12) United States Patent
Maruyama

(10) Patent No.: US 7,962,660 B2
(45) Date of Patent: Jun. 14, 2011

(54) INFORMATION PROCESSING APPARATUS, INFORMATION PROCESSING SYSTEM, AND RECORDING MEDIUM

(75) Inventor: Akeo Maruyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 245 days.

(21) Appl. No.: 11/806,281

(22) Filed: May 31, 2007

(65) Prior Publication Data

US 2007/0299989 A1    Dec. 27, 2007

(30) Foreign Application Priority Data

May 31, 2006  (JP) ................ 2006-152182
Apr. 23, 2007  (JP) ................ 2007-113470

(51) Int. Cl.
*G06F 3/00* (2006.01)
(52) U.S. Cl. .......... 710/8; 710/5; 710/10; 710/11; 710/64; 710/72
(58) Field of Classification Search .......... 710/5, 8, 710/11, 64, 72
See application file for complete search history.

(56) References Cited

U.S. PATENT DOCUMENTS

| 6,560,659 | B1 * | 5/2003 | Tobias et al. ............ 710/8 |
| 2004/0210683 | A1 * | 10/2004 | Connor et al. ........... 710/15 |
| 2006/0152760 | A1 * | 7/2006 | Hong et al. ............ 358/1.15 |
| 2009/0024757 | A1 * | 1/2009 | Proctor ................ 709/232 |

FOREIGN PATENT DOCUMENTS

JP   2004-310488   11/2004
JP   2005-173701   6/2005

* cited by examiner

*Primary Examiner* — Tariq Hafiz
*Assistant Examiner* — Jasjit S Vidwan
(74) *Attorney, Agent, or Firm* — Harness, Dickey & Pierce, P.L.C.

(57) ABSTRACT

An information processing apparatus is disclosed that is connected to a device and generates data processable by the device based on device information about the device. The information processing apparatus includes a processing content setting unit that specifies, based on the device information, processing content to be executed by the device; a command retrieving unit that, if the processing content specified by the processing content setting unit contains unknown information, retrieves a command corresponding to the unknown information from the device information; and a data generating unit that generates, based on the command retrieved by the command retrieving unit and the processing content, data processable by the device.

17 Claims, 17 Drawing Sheets

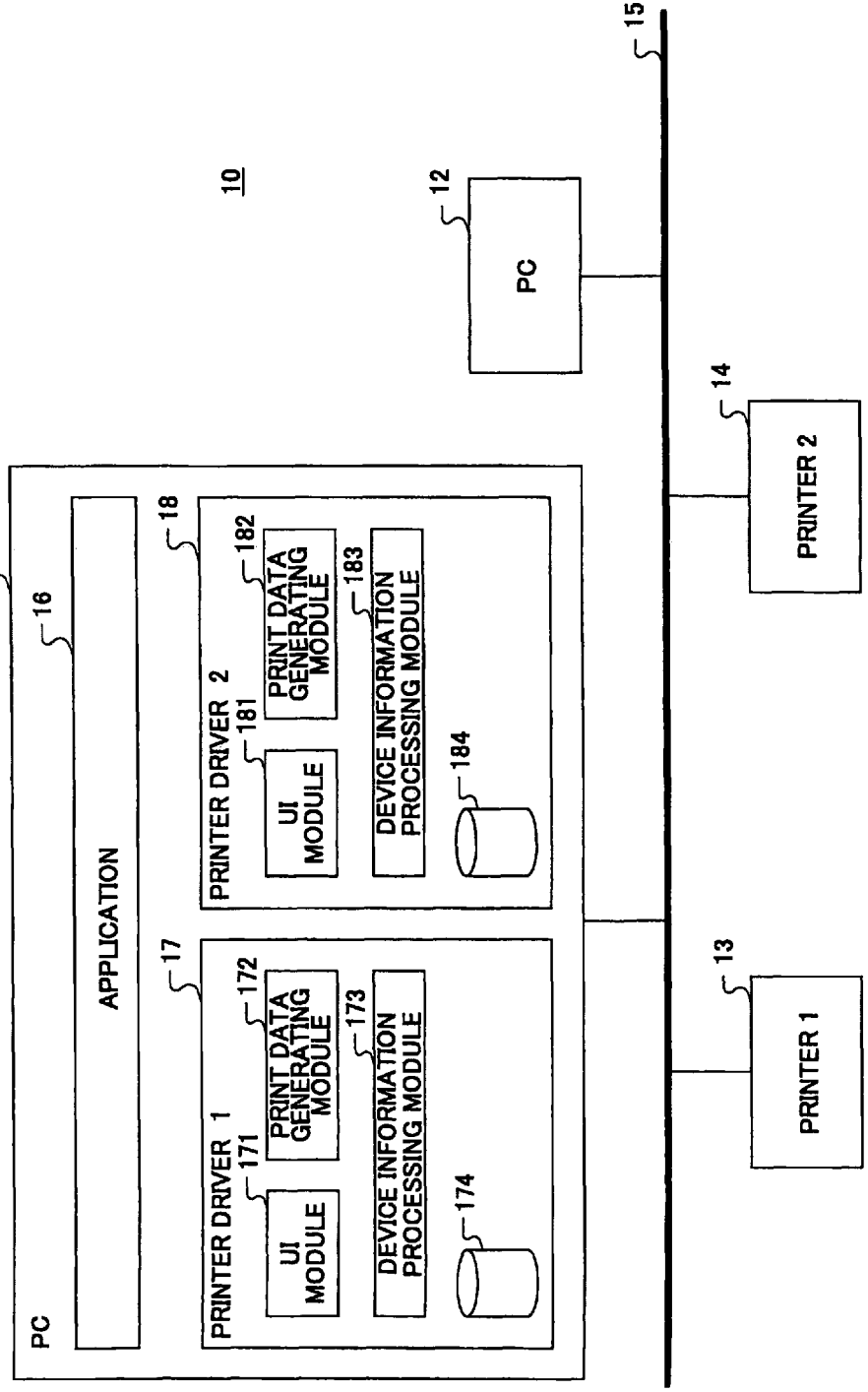

FIG.10A

| | 210 | 220 | 230 |
|---|---|---|---|
| Color Support | Available | |
| Duplex Printing | Available | |
| | Option List | Top, Right, Left |
| Staple | Available | |
| | Option List | Upper Right, Lower Left |
| Punch | N/A | |
| ... | | |
| Paper Type | See Reference Information | |
| ... | | |

FIG.10B

| | 260 | 270 | 280 |
|---|---|---|---|
| Plain | | 1 | PLAIN |
| Thick | | 2 | THICK |
| ... | | | |
| Special 3A | | 512 | SPECIAL3A |
| Thick Blue | | 513 | THICKBLUE |
| ... | | | |

| Paper Size ⸏240 | A4 ⸏250 |
|---|---|
| Orientation | Portrait |
| Color/Monochrome | Color |
| ... | |
| Duplex | Side Stitching |
| ... | |
| Staple | Upper Left |
| Punch | Off |
| ... | |
| Paper Type | 512 |
| ... | |

FIG.13B

| ... | ... | | |
|---|---|---|---|
| ... | 1 | | |
| Z folding | 5 | ZFOLDING | See Reference Information 2 |
| ... | | | |

| Paper Size | 0 | OFF |
|---|---|---|
| Left | 1 | LEFT |
| Right | 2 | RIGHT |
| Top | 3 | TOP |

| | | |
|---|---|---|
| Paper Size | A4 | |
| Orientation | Portrait | |
| Color/Monochrome | Color | |
| ... | | |
| Duplex | Side Stitching | |
| ... | | |
| Staple | Upper Left | |
| Punch | Off | |
| ... | | |
| Paper Type | 512 | |
| ... | | |
| | | |
| 1 | 0 | |
| 2 | 0 | |
| 3 | 0 | |
| 4 | 0 | |
| 5 | 1 | 1 |
| 6 | 0 | |
| ... | | |

2400, 2500, 2510, 2520, 200a, 200b

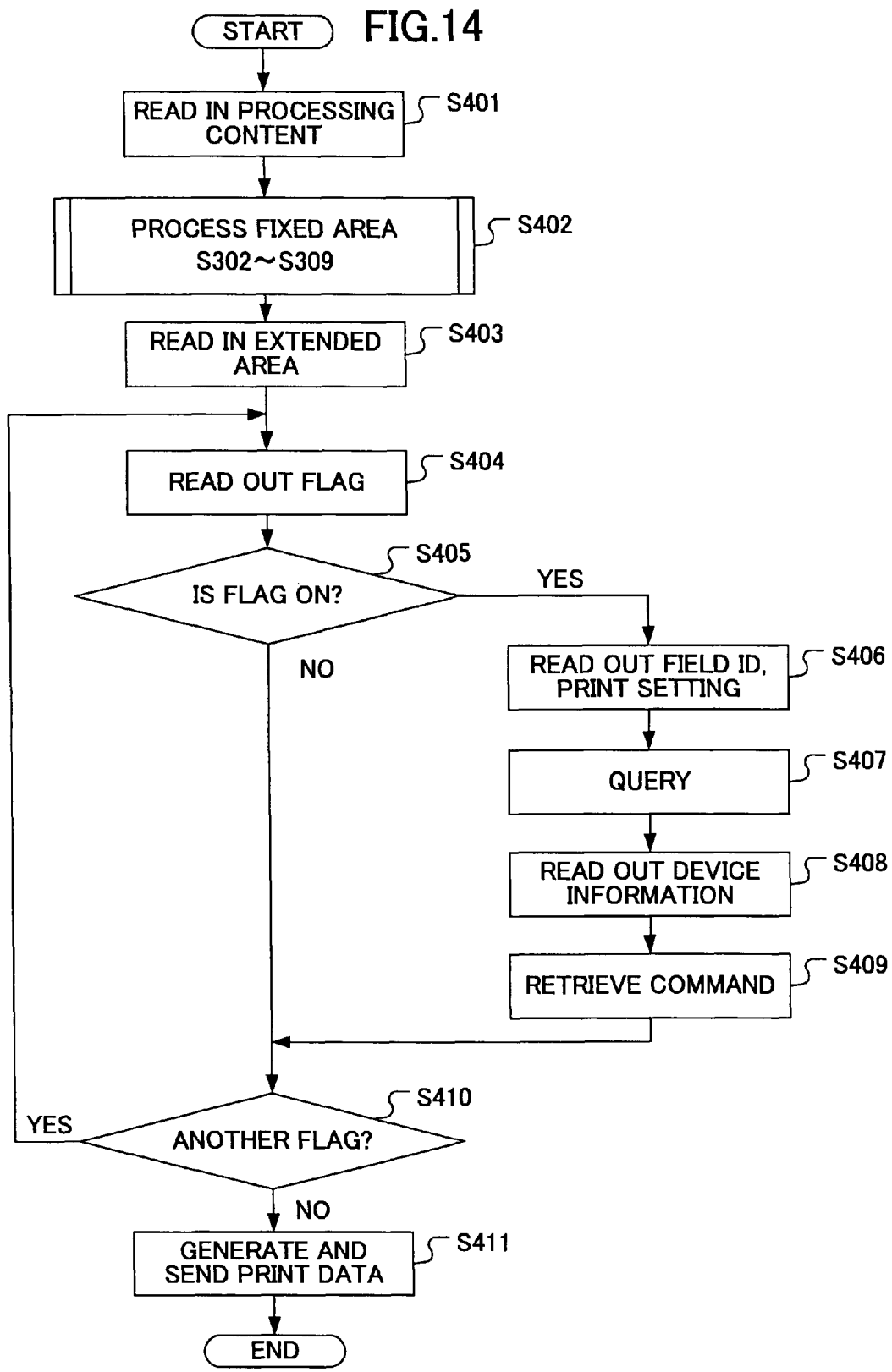

INFORMATION PROCESSING APPARATUS, INFORMATION PROCESSING SYSTEM, AND RECORDING MEDIUM

BACKGROUND OF THE INVENTION

1. Field of the Invention

The present invention relates to an information processing apparatus that is connectable to a device, a recording medium having a program embodied therein, the program causing a computer to function as such an information processing apparatus, and an information processing system including a device and an information processing apparatus connected to each other.

2. Description of the Related Art

If an information processing apparatus such as, e.g., a personal computer (hereinafter referred to simply as a "PC") is connected to peripheral devices such as, e.g., a printer, a scanner, and a facsimile (fax) machine on a network, the PC includes device drivers for converting data generated by applications installed therein into data processable by the peripheral devices.

FIG. 1 is a diagram illustrating an exemplary network configuration of a related-art information processing system 10 including first and second PCs 11 and 12 and first and second printers 13 and 14.

With reference to FIG. 1, the information processing system 10 includes the first and second PCs 11 and 12, the first and second printers 13 and 14, and a network 15 interconnecting the PCs 11 and 12 and the printers 13 and 14 for enabling data communications among them.

The first PC 11 has an application 16 that runs on an OS (Operating System), a first printer driver 17 for the first printer 13, and a second printer driver 18 for the second printer 14.

The second PC 12 generally has the same configuration as the first PC 11.

The first printer driver 17 includes a user interface (UI) module 171, a print data generating module 172, a device information processing module 173, and a storage unit 174.

The UI module 171 is adapted to display a setting screen for configuring the first printer 13 based on device information about various functions of a printer corresponding to the first printer driver 17, i.e., the first printer 13. A user enters settings of the functions of the first printer 13 on the setting screen displayed by the UI module 171. The UI module 171 specifies processing content to be executed by the first printer 13 based on the settings entered by the user.

The print data generating module 172 is adapted to convert document data and the like created or read by the application 16 into print data readable by the first printer 13 according to the settings of the functions of the first printer 13 entered by the user. The device information processing module 173 is adapted to read out device information of the first printer 13 from the storage unit 174 to enable the UI module 171 to display the setting screen. The storage unit 174 is adapted to store the device information of the first printer 13.

The second printer driver 18 generally has the same configuration as the first printer driver 17.

The term "device information" as used herein includes file information that associates device configuration information of a peripheral device, such as a printer, with command information related thereto. The "processing content" as used herein includes information about device initialization, environments of a peripheral device, etc., and is stored in a DEVMODE structure. FIGS. 2A and 2B are diagrams schematically illustrating exemplary data structures of the device information and the processing content, respectively, according to a related-art technique.

Referring to FIG. 2A, the device information is stored in a table data structure. The data structure shown in FIG. 2A includes columns 21, 22, and 23. The column 21 contains the names of functions of a printer. The column 22 contains data indicating whether the functions shown in the column 21 are executable. If the column 22 contains data indicating that a function is executable and the presence of options for advanced settings for executing the function, the column 23 contains the options. For example, in the case of a printer, "options" for executing a "staple" function may include positions at which the paper is stapled ("upper right", "lower left", etc.).

Referring to FIG. 2B, similar to the device information shown in FIG. 2A, the processing content is stored in a table data structure for ease of understanding. The data structure shown in FIG. 2B includes columns 24, and 25. The column 24 contains the names of the functions of the printer. The column 25 contains a print setting entered on the setting screen by the user, i.e., values of the options selected by the user from the column 23 of the device information shown in FIG. 2A.

The following describes operations of the printer driver 17 in the related-art information processing system shown in FIG. 1.

For instance, if a user requests to configure print settings of the first printer 13 of FIG. 1, in step S101, a setting screen calling request is sent from the application 16 to the UI module 171 so as to display a setting screen for print setting of the first printer 13. Upon reception of the request from the application 16, in step S102, the UI module 171 sends a device information retrieval instruction to the device information processing module 173 so as to retrieve device information of the first printer 13. The device information processing module 173 reads out the device information stored in the storage unit 174 (FIG. 1) in step S103, and sends the read device information to the UI module 171 in step S104. In step S105, the UI module 171 displays the setting screen for specifying print settings of the first printer 13 on a display unit (not shown) such as a monitor based on the device information sent from the device information processing module 173. In step S106, a user enters print setting values for the first printer 13 on the setting screen displayed by the UI module 171 with use of input units such as a mouse and a keyboard (not shown). In step S107, the UI module 171 specifies processing content to be executed by the first printer 13 according to the setting values entered by the user and, in step S108, sends the specified processing content to the application 16. After that, in step S109, the application 16 stores the processing content.

In step S110, on the application 16, the user makes a request for printing by the first printer 13. Then, in step S111, the print data generating module 172 reads in the processing content stored in the application 16. In step S112, the print data generating module 172 generates print data readable by the first printer 13 based on the read processing content and, in step S113, sends the generated print data to the first printer 13 or a spooler (not shown). After that, in step S114, the print data generating module 172 sends a transmission completion report to the application 16. In step S115, the application 16 receives the transmission completion report. Thus, print processing is completed.

As described above, according to related art, a PC typically includes printer drivers one for each printer connected to the PC. In other words, a PC includes the same number of printer drivers as the number of printers to be used.

Japanese Patent Laid-Open Publication No. 2004-310488 (Patent Document 1), for example, discloses a printing system that includes a single driver for printers of the same type. In the printing system disclosed in Patent Document 1, the same identifier is assigned to printers of the same type, which have different network IDs, thereby eliminating the need for installing the same number of printer drivers as the number of the printers into a terminal that manages the printers.

In the case of replacing a current device with a new device for reasons such as service life or failure, if the new device has an additional new function although the type of the new device is the same as the current device, a device driver supporting the added function needs to be installed in an information processing apparatus.

Japanese Patent Laid-Open Publication No. 2005-173701 (Patent Document 2), for example, discloses an information processing apparatus that adds a new function by installing a plug-in module in place of installing an entire driver.

According to the printing system disclosed in Patent Document 1, only when all the printers are of the same type, the terminal does not require more than one printer driver. However, if the printers are of the different types, plural printer drivers need to be installed in the terminal.

According to the information processing apparatus disclosed in Patent Document 2, users need to select a plug-in module to be added from a list of available plug-in modules. That is, the users need to know the functions of the available plug-in modules, which remains a burden to the users.

Recently, there have been developed so-called universal drivers that can be commonly used not only among devices of the same vendor but also devices of different vendors. Presently, however, such a universal driver only has device information about functions common to those devices. Accordingly, in many cases, it is impossible to use a function specific to each device. Another problem with such a universal driver is that, if a function is added to a device supported by a universal driver, another universal driver needs to be installed.

SUMMARY OF THE INVENTION

The present invention solves one or more of the above described problems. The present invention is directed to an information processing device and an information processing system capable of generating data processable by a device irrespective of the type of the device and function enhancement to the device.

According to an aspect of the present invention, there is provided an information processing apparatus that is connected to a device and generates data processable by the device based on device information about the device, the information processing apparatus comprising: a processing content setting unit that specifies, based on the device information, a processing content to be executed by the device; a command retrieving unit that, if the processing content specified by the processing content setting unit contains unknown information, retrieves a command corresponding to the unknown information from the device information; and a data generating unit that generates, based on the command retrieved by the command retrieving unit and the processing content, data processable by the device.

With this configuration, the information processing apparatus is capable of generating data processable by the device regardless of the type of the device and providing function enhancement to the device.

It is preferable that the device information include reference information containing a setting value that represents a setting of a function executable by the device and a command corresponding to the setting value.

With this configuration, it is possible to update the device information stored in the information processing apparatus to match the current device information about the device.

It is also preferable that the processing content setting unit specify the processing content to be executed by the device with the setting value, and that the command retrieving unit retrieve, based on the setting value with which the processing content is specified, the command from the reference information.

With this configuration, in the case where the device information stored in the information processing apparatus is updated to match the current device information about the device, it is possible to specify the processing content with the setting value contained in the reference information, and to retrieve a command for generating data processable by the device from the reference information based on the setting value with which the processing content is specified.

It is also preferable that the device information include first reference information containing extended function information representing an extended function of the device and an extended function command corresponding to the extended function information, and that the first reference information include second reference information containing an extended function setting value that represents a setting of the extended function and an extended function setting command corresponding to the extended function setting value.

With this configuration, it is possible to update the device information stored in the information processing apparatus to match the current device information about the device.

It is also preferable that the processing content setting unit specify the processing content with the extended function information and the extended function setting value, and that the command retrieving unit retrieve, based on the extended function information and the extended function setting value with which the processing content is specified, the extended function command and the extended function setting command from the first reference information and the second reference information, respectively.

With this configuration, in the case where the device information stored in the information processing apparatus is updated to match the present device information about the device, it is possible to specify the processing content with the information and the setting value contained in the reference information, and to retrieve a command for generating data processable by the device from the reference information based on the information and the setting value with which the processing content is specified.

It is also preferable that the processing content include a fixed area for containing information about an original function of the device and a setting value that represents a setting of the original function, and an extended area for containing the extended function information and the extended function setting value.

This configuration enables the information processing apparatus to handle new information in the present device information included upon the function enhancement of the device.

It is also preferable that the information processing apparatus further comprise a setting screen display unit that displays a setting screen for specifying, based on the device information, the processing content to be executed by the device.

This configuration allows users to visually recognize the settings of the device and perform setting of the device.

It is also preferable that the information processing apparatus further comprise a command memory unit that stores a command recognizable by the device in a manner associated with a setting value recognizable by the data generating unit, and that the command retrieving unit determine, if the processing content specified by the processing content setting unit contains a setting value that is not stored in the command memory unit, the setting value as being the unknown information.

With this configuration, it is possible to handle values that are not prestored as unknown information pieces.

According to an aspect of the present invention, there is provided an information processing apparatus that is connected to a device and generates data processable by the device based on device information about the device, the information processing apparatus comprising: a processing content setting unit that specifies, based on the device information, a processing content to be executed by the device; a command retrieving unit that, if the processing content specified by the processing content setting unit contains unknown information, retrieves a command corresponding to the unknown information from the device information; and a data generating unit that generates, based on the command retrieved by the command retrieving unit and the processing content, data processable by the device.

According to still another aspect of the present invention, there is provided an information processing system comprising an information processing apparatus, a device, and a storage unit. The storage unit stores device information about a function executable by the device. The information processing apparatus includes a device information retrieving unit that retrieves the device information from the storage device; a processing content setting unit that specifies, based on the device information, a processing content to be executed by the device; a command retrieving unit that, if the processing content specified by the processing content setting unit contains unknown information, retrieves a command corresponding to the unknown information from the device information retrieved by the device information retrieving unit; a data generating unit that generates, based on the command retrieved by the command retrieving unit and the processing content, data processable by the device; and a data sending unit that sends the data generated by the data generating unit to the device. The device includes a data receiving unit that receives data sent from the information processing apparatus; and a data processing unit that processes data received by the data receiving unit.

Embodiments of the present invention provide an information processing apparatus, a recording medium, and an information processing system that are capable of generating data processable by a device regardless of the type of the device and function enhancement to the device.

BRIEF DESCRIPTION OF THE DRAWINGS

FIG. 1 is a diagram illustrating an exemplary network configuration of an information processing system according to a related-art technique;

FIG. 10A is a diagram schematically showing an exemplary data structure of device information according to Embodiment 1;

FIG. 10B is a diagram schematically showing an exemplary data structure of reference information associated with the device information of FIG. 10A;

FIG. 13B is a diagram schematically showing an exemplary data structure of first reference information associated with the device information of FIG. 13A;

FIG. 13C is a diagram schematically showing an exemplary data structure of second reference information associated with the first reference information of FIG. 13B;

FIG. 13D is a diagram schematically showing an exemplary data structure of processing content based on the device information of FIG. 13A, the first reference information of FIG. 13B, and the second reference information of FIG. 13C; and FIG. 14 is a flowchart illustrating an example of command retrieval operations performed by a printer driver for the processing content in FIG. 13D according to Embodiment 2.

DETAILED DESCRIPTION OF THE PREFERRED EMBODIMENT

The following describes preferred embodiments of the present invention with reference to the accompanying drawings.

Figure 2A:
FIG. 2A is a diagram schematically showing an exemplary data structure of device information according to a related-art technique.
Figure 2B:
FIG. 2B is a diagram schematically showing an exemplary data structure of processing content according to a related-art technique.
Figure 3:
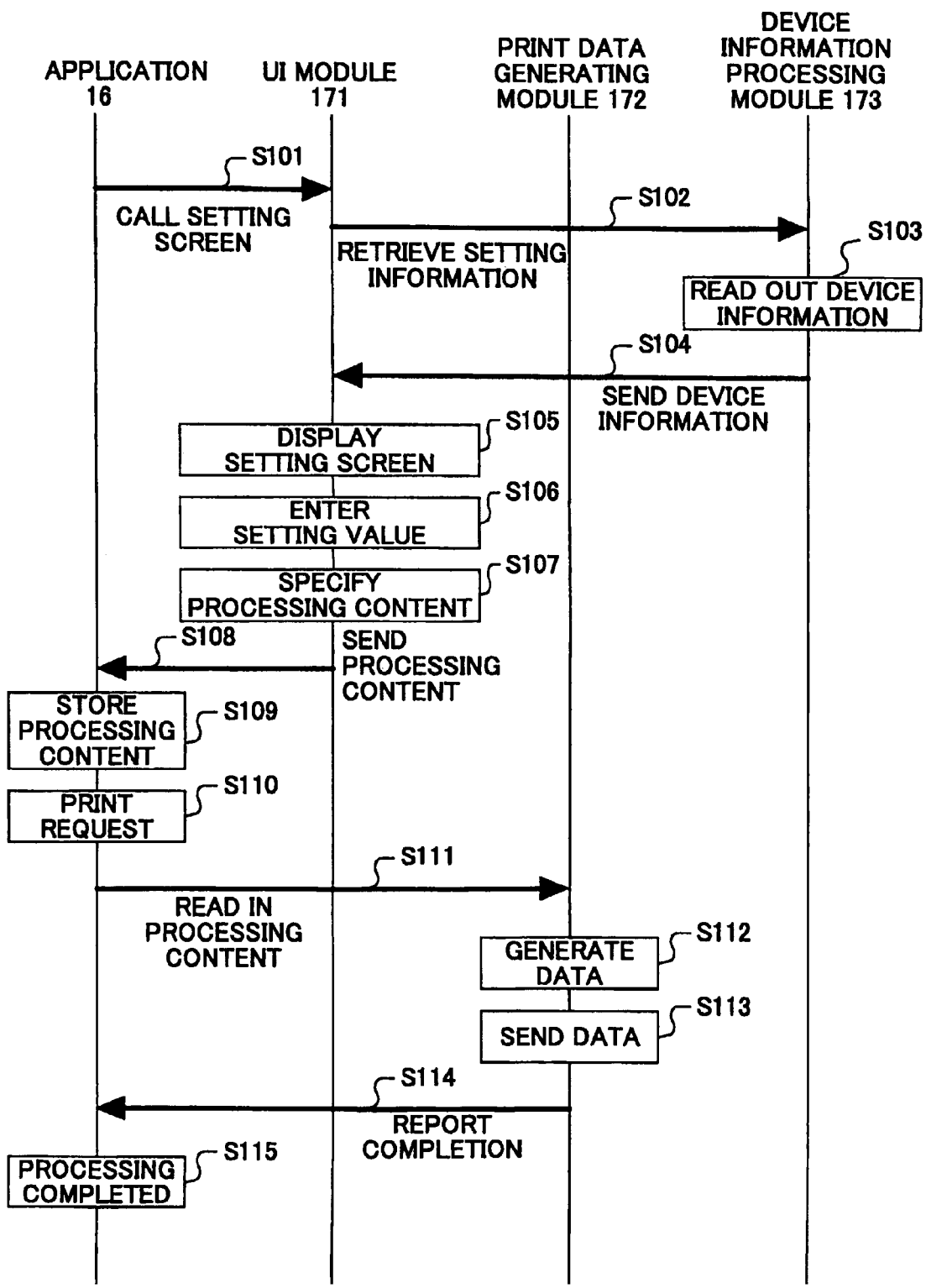
FIG. 3 is a sequence diagram illustrating processing performed by a printer driver according to a related-art technique.
Figure 4:
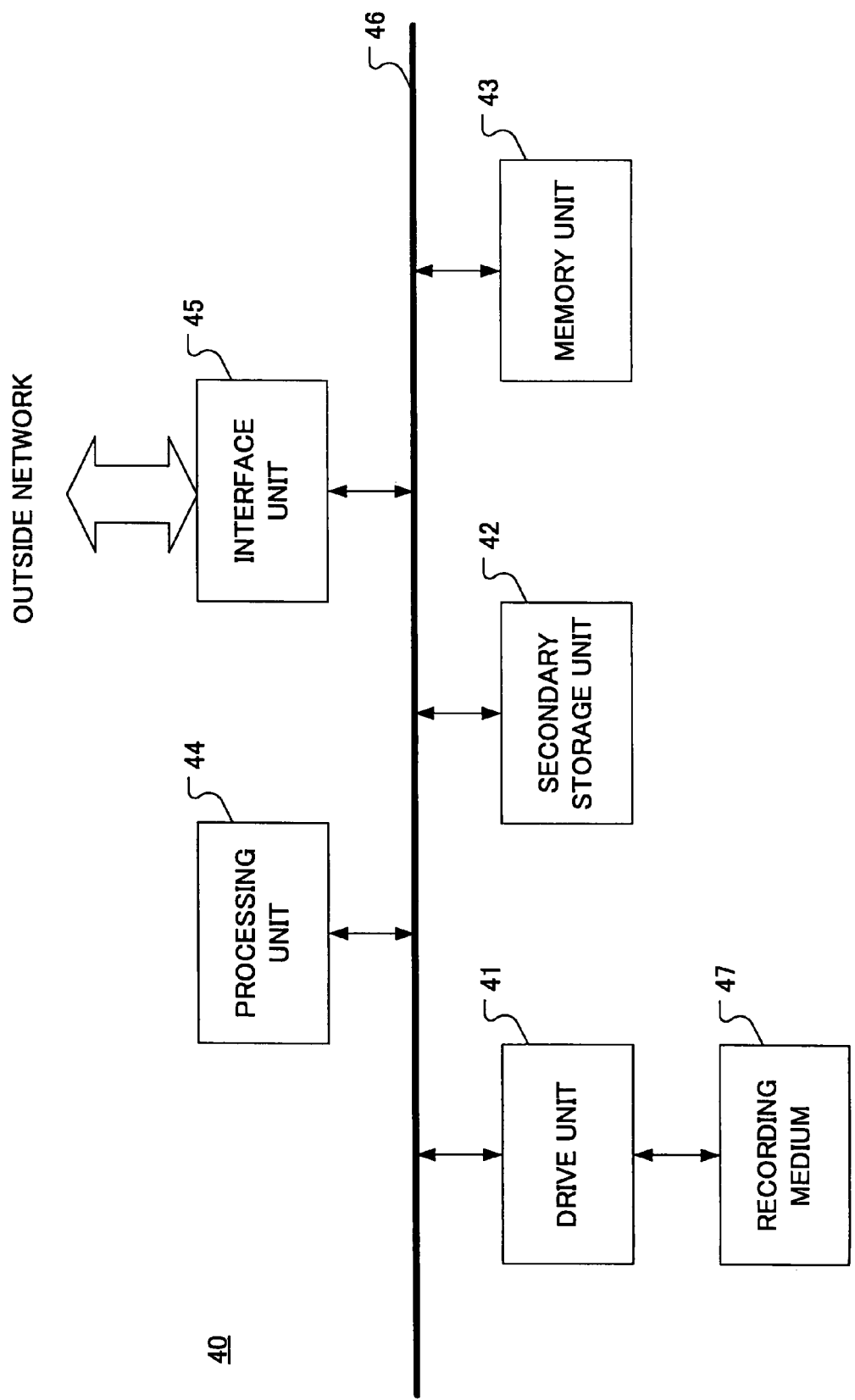
FIG. 4 is a diagram illustrating an exemplary hardware configuration of a computer according to an embodiment of the present invention.

FIG. 4 is a diagram illustrating an exemplary hardware configuration of a computer 40 according to an embodiment of the present invention. As shown in FIG. 4, the computer 40 comprises a drive unit 41, a secondary storage unit 42, a memory unit 43, a processing unit 44, an interface unit 45, and a bus 46 interconnecting these units. Programs to be executed by the computer 40 are provided by a recording medium 47 such as a CD-ROM.

The drive unit 41 is adapted to read the recording medium 47. When the recording medium 47 with a program recorded therein is loaded into the drive unit 41, the program is installed into the secondary storage unit 42 from the recording medium 47 through the drive unit 41. In this embodiment, although various device drivers such as printer drivers and PC-FAX drivers are applicable as a program recorded in the recording medium 47, a printer driver is illustrated as an example in the following description for ease of explanation.

The secondary storage unit 42 is adapted to store the installed program as well as necessary files and data. The memory unit 43 is adapted to read out the program from the secondary storage unit 42 in response to an instruction for activating the program, and holds the program therein. The processing unit 44 is adapted to execute a function of the computer 40 according to the program held in the memory unit 43. The interface unit 45 is adapted to connect the computer 40 to an outside network or a public line.

Figure 5:
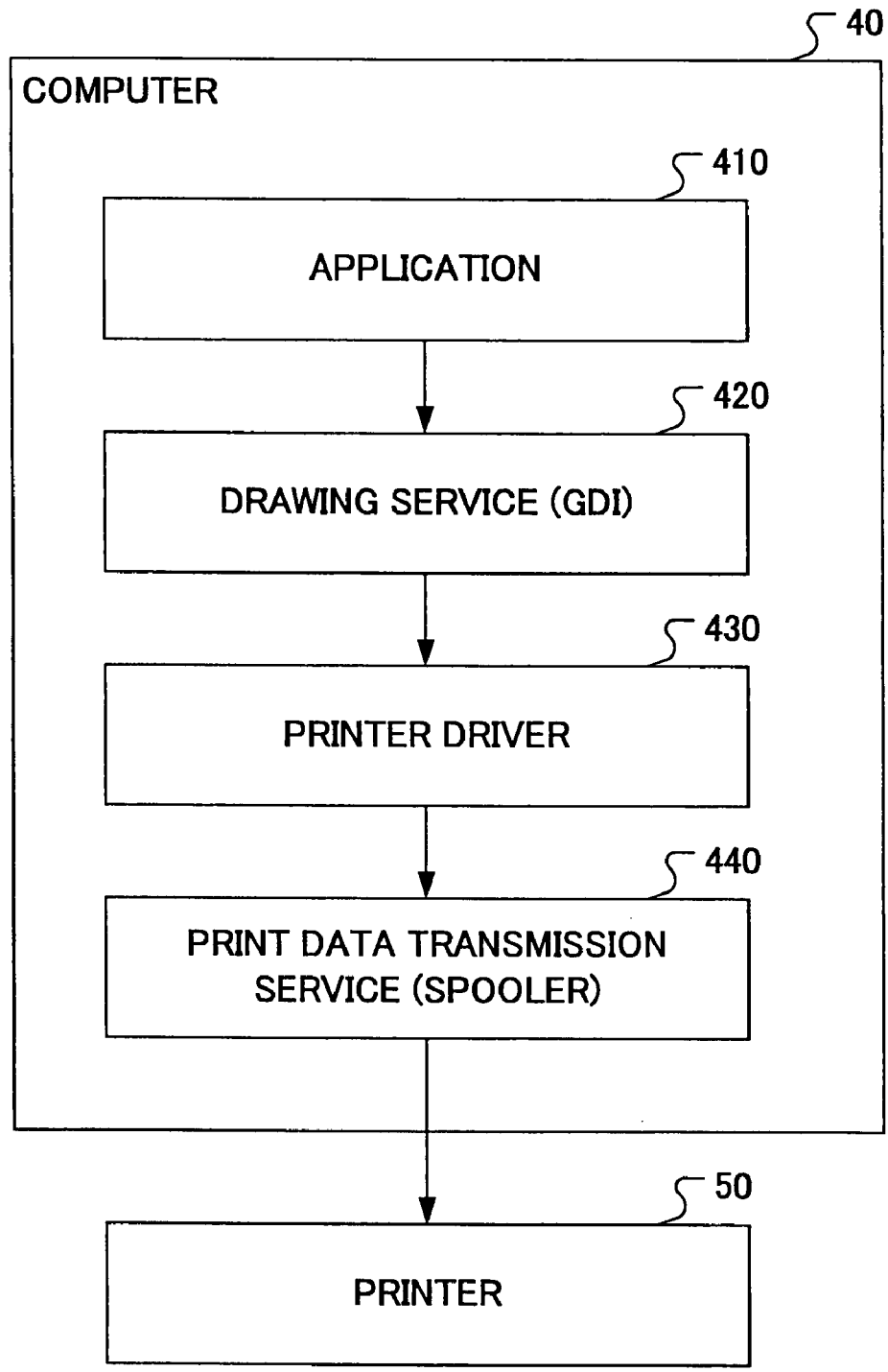
FIG. 5 is a diagram illustrating an exemplary functional configuration of a computer according to an embodiment of the present invention.

FIG. 5 is a diagram illustrating an exemplary functional configuration of the computer 40. With reference to FIG. 5, the computer 40 is connected to a printer 50 via a network, and comprises an application 410, a drawing service 420, a printer driver 430, and a print data transmission service 440. The computer 40 is not limited to a general purpose PC and may include a server PC, a PDA (personal Digital Assistant), a portable terminal such as a cellular phone, and a device embedded in a printer or a compound machine.

The application 410 is a program that runs on an OS such as, e.g., Windows (TM), and is a general purpose application such as, e.g., document processing software and spreadsheet software.

The drawing service 420 is a drawing engine that runs on an OS, and is typically included in a GDI (Graphic Device Interface) together with an interface connecting the application 410 and the drawing service 420.

The printer driver 430 is adapted to convert internal commands for the OS into print data, i.e., so-called Page Description Language (PDL) data, readable by the printer 50. Generally, the GDI and the printer driver 430 are interconnected through an interface called DDI (Device Driver Interface).

The print data transmission service 440 is a so-called spooler, which spools the PDL data generated by the printer driver 430. The PDL data spooled by the spooler 440 are transmitted from a print port to the printer 50 through the network.

Figure 6:
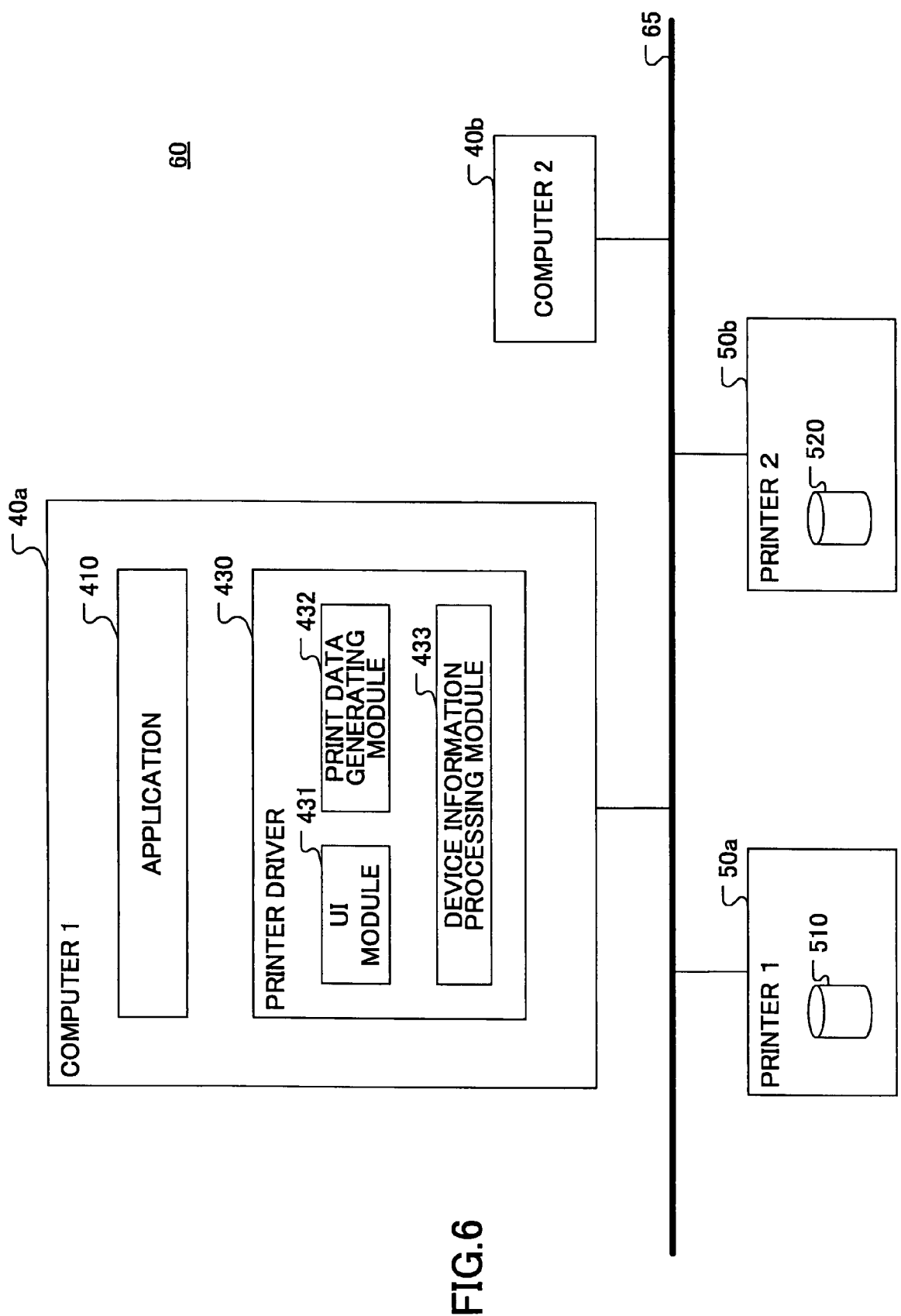
FIG. 6 is a diagram illustrating an exemplary network configuration of an information processing system according to an embodiment of the present invention.

FIG. 6 is a diagram illustrating an exemplary network configuration of an information processing system 60 in which plural of the above-described computer 40 and printers are interconnected.

With reference to FIG. 6, the information processing system 60 includes first and second computers 40a and 40b, first and second printers 50a and 50b, and a network 65 interconnecting the computers 40a and 40b and the printers 50a and 50b for enabling data communications among them.

The first computer 40a includes an application 410 and a printer driver 430. The second computer 40b generally has the same configuration as the first computer 40a.

The first and second printers 50a and 50b include storage units 510 and 520, respectively. The storage units 510 and 520 are adapted to store device information about functions of the first and second printers 50a and 50b, respectively.

The printer driver 430 includes a user interface (UI) module 431, a print data generating module 432, and a device information processing module 433.

The UI module 431 is adapted to display a setting screen for configuring the first and second printers 50a and 50b based on device information about various functions of the first and second printers 50a and 50b, respectively. A user enters settings of the functions of each of the first and second printers 50a and 50b on the setting screen displayed by the UI module 431. The UI module 431 specifies processing content to be executed by the first and second printers 50a and 50b, respectively, based on the settings entered by the user.

The print data generating module 432 is adapted to convert document data, etc., created or read by the application 410 into print data readable by the first and second printers 50a and 50b according to the settings of the functions of the first and second printers 50a and 50b, respectively, entered by the user. The device information processing module 433 is adapted to read out device information of the first and second printers 50a and 50b from the storage units 501 and 520, respectively, to enable the UI module 431 to display the setting screen.

The following describes processing performed by the computer 40 in detail.

Figure 7:
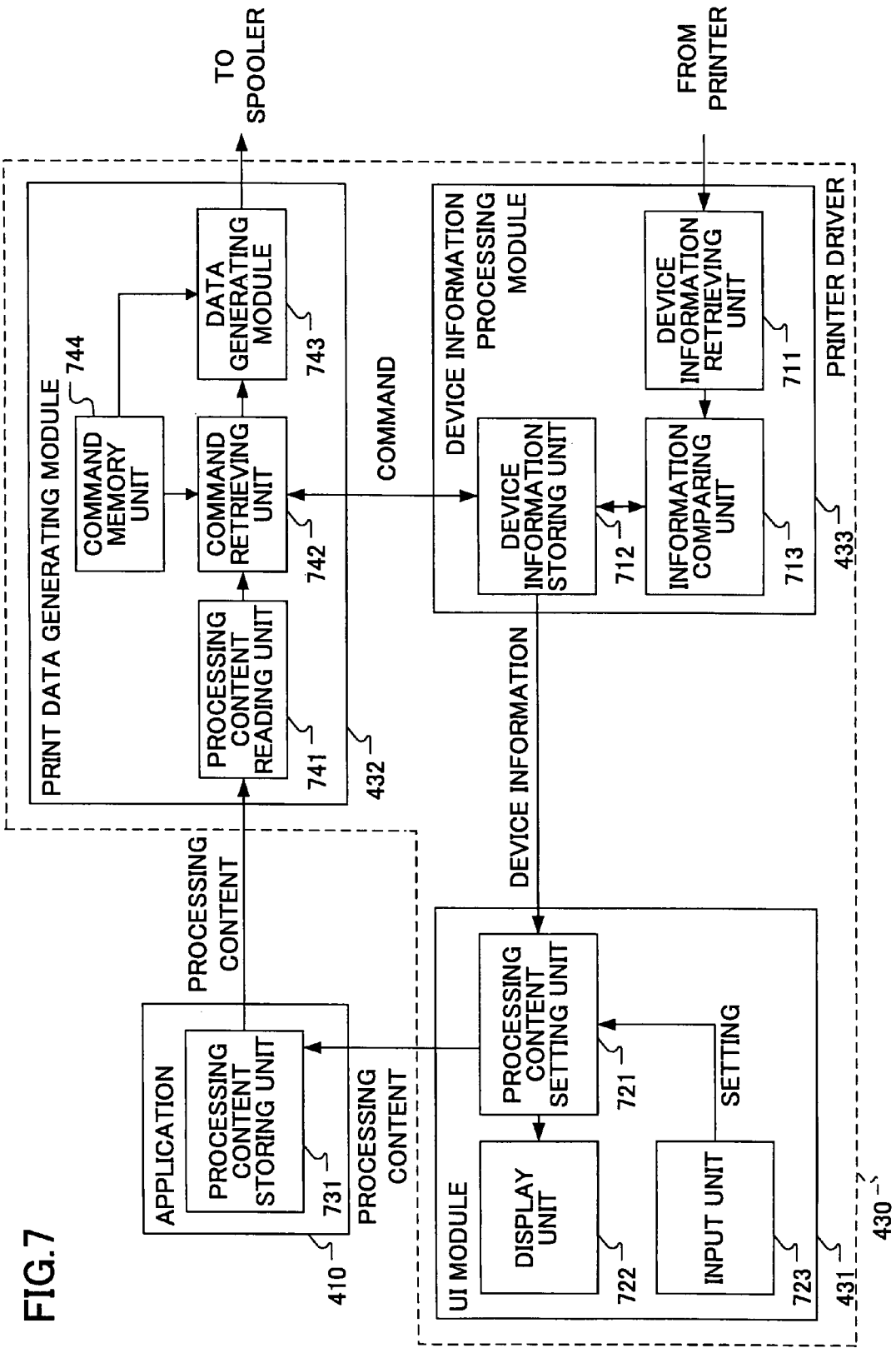
FIG. 7 is a block diagram illustrating an exemplary configuration of a printer driver in a computer according to an embodiment of the present invention.

FIG. 7 is a block diagram illustrating an exemplary configuration of the printer driver 430 included in the computer 40 according to the present embodiment.

The printer driver 430 includes the user interface (UI) module 431, the print data generating module 432, and the device information processing module 433.

The device information processing module 433 includes a device information retrieving unit 711 that retrieves device information about a function executable by a printer connected via the network as shown in FIG. 6, device information storing unit 712 that stores previously retrieved device information about the printer or other printers, and an information comparing unit 713 that compares device information retrieved by the device information retrieving unit 711 and the device information stored in the device information storing unit 712. Based on the result of comparison by the information comparing unit 713, the device information stored in the device information storing unit 712 is updated with use of new information contained in the device information retrieved by the device information retrieving unit 711.

The UI module 431 includes a processing content setting unit 721 that generates, based on the device information stored in the device information storing unit 712, a setting screen on which print setting for document data to be printed is entered, and stores processing content entered on the setting screen into the below-described DEVMODE structure or the like, a display unit 722 that displays the setting screen generated by the processing content setting unit 721 on a monitor or the like (not shown), and an input unit 723 that receives user's input through a keyboard, a mouse, and the like.

The application 410 includes a processing content storing unit 731 that stores the processing content specified by the processing content setting unit 721. The processing content storing unit 731 may include predetermined types of structures such as a DEVMODE structure (described below).

The print data generating module 432 includes the processing content reading unit 741 that reads in the processing content stored in the processing content storing unit 731, a command retrieving unit 742 that examines the read processing content so as to determine whether the read processing content contains information unknown to the print data generating module 432 and, if unknown information is contained, retrieves a command corresponding to the unknown information, a data generating unit 743 that generates print data readable by the printer based on the command retrieved by the command retrieving unit 742 and the processing content read by the processing content reading unit 741, and a command memory unit 744 that stores a command recognizable by the printer in a manner associated with a setting value recognizable by the print data generating module 432.

The command retrieving unit 742 compares the setting values contained in the processing content read by the processing content reading unit 741 with the setting values stored in the command memory unit 744 so as to determine whether the processing content read by the processing content reading unit 741 contains information unknown to the data generating module 743. More specifically, the command memory unit 744 stores information such as items or values prestored in a fixed area in a DEVMODE structure (described below), and command retrieving unit 742 recognizes information not stored in the fixed area as unknown information.

The data generating unit 743 retrieves a command corresponding to the setting value contained in the processing content read by the processing content reading unit 741, and generates print data based on the retrieved command and the command retrieved by the command retrieving unit 742. The print data generated by the data generating unit 743 are sent to the spooler 440.

Figure 8:
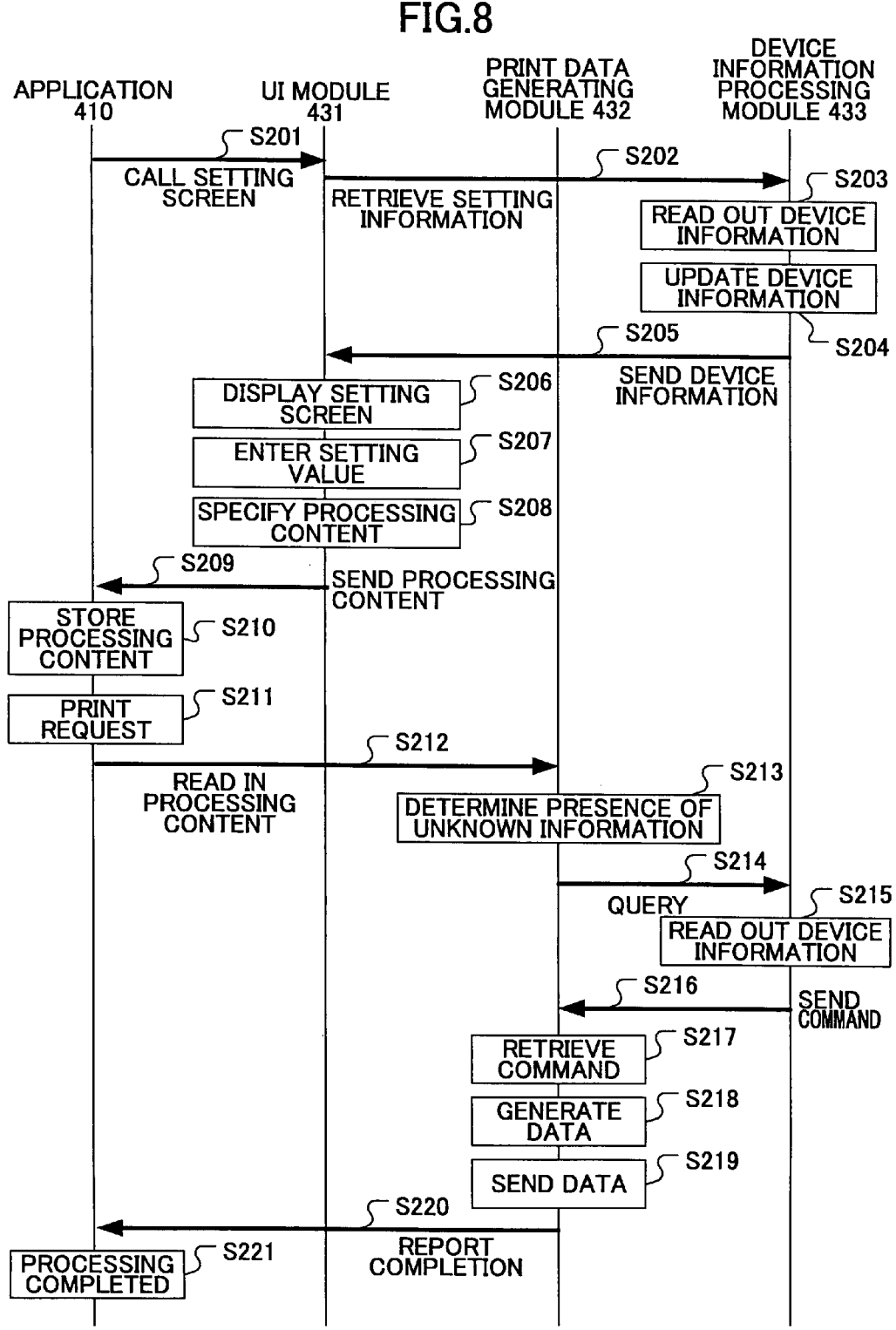
FIG. 8 is a sequence diagram illustrating processing performed by a printer driver according to an embodiment of the present invention.

The following describes processing performed by the printer driver 430 with reference to the sequence diagram shown in FIG. 8.

For instance, if a user requests to configure a print setting of the first printer 50a of FIG. 6, (e.g. if a user presses a "properties" button on a print setting screen of an application running on Windows (TM)), in step S201, a setting screen calling request is sent from the application 410 to the UI module 431 so as to display a setting screen (e.g. a properties screen) for print setting of the first printer 50a. Upon reception of the request from the application 410, in step S202, the UI module 431 sends a device information retrieval instruction to the device information processing module 433 so as to retrieve device information of the first printer 50a.

Upon reception of the instruction from the UI module 431, in step S203, the device information processing module 433 reads out the device information stored in the storage unit 510 of the first printer 50a by using the device information retrieving unit 711. Then, in step S204, the information comparing unit 713 compares the device information read out by the device information retrieving unit 711 with the device information stored in the device information storing unit 712 so as to update the device information in the device information storing unit 712 using new information contained in the device information read out by the device information retrieving unit 711. In this way, the device information in the device information storing unit 712 is rewritten to reflect currently executable functions of the first printer 50a. In step S205, the updated device information is sent to the UI module 431.

Upon reception of the device information from the device information processing module 433, in step S206, the UI module 431 generates a setting screen for specifying settings of the functions of the first printer 50a based on the received device information, and displays the setting screen on the display unit 722. In step S207, a user enters print setting values for the first printer 50a on the setting screen displayed by the display unit 722 with use of the input unit 723. In step S208, the processing content setting unit 721 specifies processing content to be executed by the first printer 50a according to the setting values entered by the user with use of the input unit 723. In step S209, the processing content is sent to the application 410. After that, in step S210, the application 410 stores the processing content in to the processing content storing unit 731.

In step S211, on the application 16, the user makes a request for printing by the printer 50a. Then, in step S212, the processing content reading unit 741 of the print data generating module 432 reads in the processing content stored in the processing content storing unit 731 of the application 410. In step S213, the command retrieving unit 742 compares the setting values contained in the read processing content with the setting values stored in the command memory unit 744 so as to determine whether the read processing content contains information unknown to the print data generating module 432. If unknown information is contained, in step S214, the command retrieving unit 742 queries the device information processing module 433 for the unknown information. In step S215, the device information processing module 433 reads out the device information stored in the device information storing unit 712, and extracts, from the read device information, a command corresponding to the unknown information for which the command retrieving unit 742 queries. Then, in step S216, the device information processing module 433 sends the command to the command retrieving unit 742.

In step S217, the command retrieving unit 742 receives the command from the device information processing module 433. In step S218, based on this command and the processing content read by the processing content reading unit 741 in step S212, the data generating unit 743 generates print data readable by the first printer 50a. In step S219, the generated print data are sent to the spooler 440. After that, in step S220, the print data generating module 432 sends a transmission completion report to the application 410. In step S221, the application 410 receives the transmission completion report. Thus, print processing is completed.

In this way, in the case where plural printers of different types are connected to the computer of this embodiment, the computer reads out device information from a desired printer and retrieves a command corresponding to unknown information from the device information as needed, instead of prestoring device information of all the printers. It is thus possible to support the different types of printers by a single printer driver.

Furthermore, in the case where functions of a printer supported by a printer driver that has been installed in the computer are enhanced, the computer retrieves a command corresponding to a new function added upon the function enhancement. It is therefore possible to easily support the enhanced function of the printer without installing another printer driver.

The following describes processing and data structures with reference to specific embodiments.

Embodiment 1

[Configuration of Setting Screen]

Figure 9:
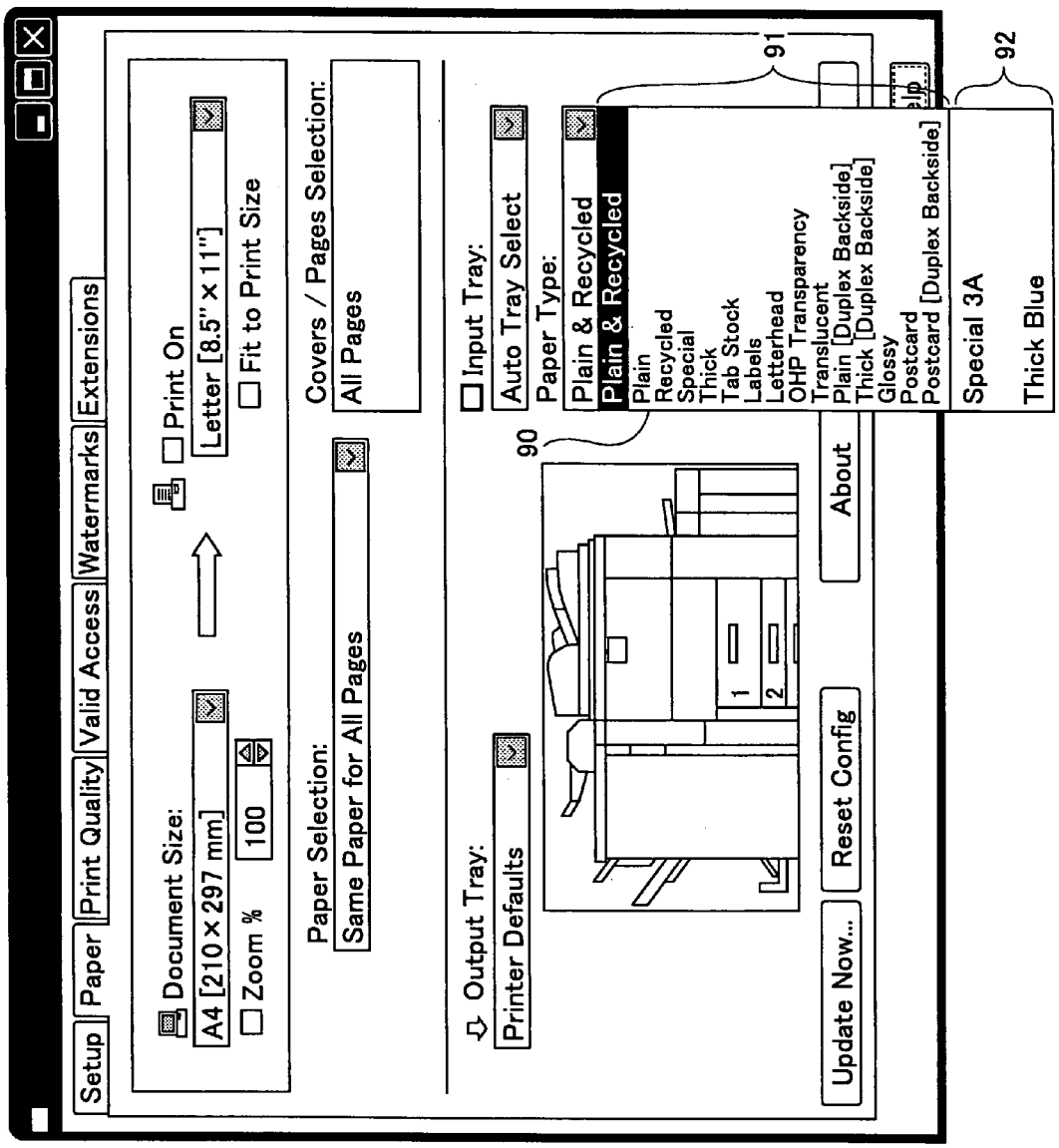
FIG. 9 shows an example of a setting screen for configuring functions of a computer according to Embodiment 1.

FIG. 9 shows an example of a setting screen for configuring functions of a computer according to the present embodiment.

The setting screen of FIG. 9 includes an item ("Paper Type") for selecting the type of paper to be used for printing. For selecting the paper type on the setting screen, an option list 90 is displayed. The option list 90 includes a default part 91 and an additional part 92. The default part 91 includes information known to the computer contained in the device information retrieved from the printer, while the additional part 92 includes information unknown to the computer. That is, the additional part 92 includes as new information the information that is added, upon the retrieval of the new device information from the printer, to the device information already stored in the computer.

Figure 10C:
FIG. 10C is a diagram schematically showing an exemplary data structure of processing content based on the device information of FIG. 10A and the reference information of FIG. 10B.

The setting screen of FIG. 9 is generated based on device information of FIG. 10A and reference information of FIG. 10B associated with the device information, both of which are in table data structures. When one of the options in the additional part 92 is selected in the setting screen of FIG. 9, a processing content is represented in a table as shown in FIG. 10C. It is to be noted that the data structures of the device information, the reference information, and the processing content are not limited to the table structures and may be other structures.

[Data Structures of Device Information and Processing Content]

FIG. 10A is a diagram schematically showing an exemplary data structure of the device information according to the present invention.

As described with reference to FIGS. 7 and 8, the printer driver 430 compares device information read out from a desired printer with the known device information by using the information comparing unit 713, extracts new information, i.e., additional information about options for a function contained in the device information read from the printer, and adds the new information to the known device information. The thus updated device information is stored into the device information storing unit 712 in the data structure as shown in FIG. 10A.

The data structure shown in FIG. 10A includes columns 210, 220, and 230. The column 210 contains the names of functions of the printer, and the column 220 contains data indicating whether the functions shown in the column 210 are executable. If the column 220 contains data indicating that a function being executable and the presence of options for advanced settings for executing the function, the column 230 contains the options. If the column 210 includes a function to which new options are added, e.g., the function "Paper Type", in place of storing options for the "Paper Type", the corresponding row in the column 230 is associated with reference information indicating the options for the "Paper Type".

FIG. 10B is a diagram schematically showing an exemplary data structure of the reference information associated with the device information of FIG. 10A.

The data structure shown in FIG. 10B includes columns 260, 270, and 280. The column 260 contains character strings to be actually displayed on the setting screen. The column 270 contains setting values, which are recognizable by the printer driver, corresponding to the individual options. The column 280 contains commands, which are recognizable by the printer, corresponding to the individual options. As in the case of the device information, the reference information is also stored into the device information storing unit 712.

As described above with reference to FIGS. 7 and 8, the printer driver 430 displays the setting screen on the display unit 722 based on the device information stored in the device information storing unit 712. As in this embodiment, if options are added to a function, the setting screen as shown in FIG. 9 is displayed based on the device information of FIG. 10A and the reference information of FIG. 10B. On the setting screen of FIG. 9, the option list 90 for "Paper Type" are based on the character strings contained in the column 260 of the reference information of FIG. 10B.

FIG. 10C is a diagram schematically showing an exemplary data structure of the processing content based on the device information of FIG. 10A and the reference information of FIG. 10B according to the present embodiment.

The data structure shown in FIG. 10C is a DEVMODE structure, and includes columns 240 and 250. The column 240 contains the names of the functions of the printer. The column 250 contains values of print setting entered by the user on the setting screen, i.e., the values selected by the user from the options in the column 230 of the device information of FIG. 10A or from the reference information of FIG. 10B. Although DEVMODE structures generally include a fixed area and an extended area, the present embodiment uses only the fixed area.

Assume that, after the device information of FIG. 10A and the reference information of FIG. 10B are stored, a user specifies the paper type on the setting screen of FIG. 9 to select an option in the additional part 92 in the option list 90. For instance, if a user selects an option "Special 3A", as shown in FIG. 10C, the setting value "512" corresponding to the character string "Special Paper 3A" in the reference information of FIG. 10B is stored into a predetermined field representing the setting of the function "Paper Type" in the processing content. Then, the processing content having the data structure as shown in FIG. 10C is stored into the application 410.

After that, if a user makes, on the application 410, a request for printing by the printer, the printer driver 430 reads the processing content from the application 410 in order to generate print data readable by the printer. The printer driver 430 compares the setting value contained in the read processing content with the setting value stored in the command memory unit 744 so as to determine whether the read processing content contains information unknown to the print data generating module 432. The printer driver 430 recognizes, as unknown information, the information newly added upon retrieval of the device information from the printer. According to this embodiment, in the processing content in FIG. 10C, the setting value "512" is recognized as unknown information.

As described above with reference to FIGS. 7 and 8, the printer driver 430 retrieves, if unknown information is contained in the processing content, a command corresponding to the unknown information from the device information in order to generate print data readable by the printer. The following describes this command retrieval operation in greater detail with reference to the block diagram of FIG. 7 and the flowchart of FIG. 11.

[Command Retrieval and Data Generation]

Figure 11:
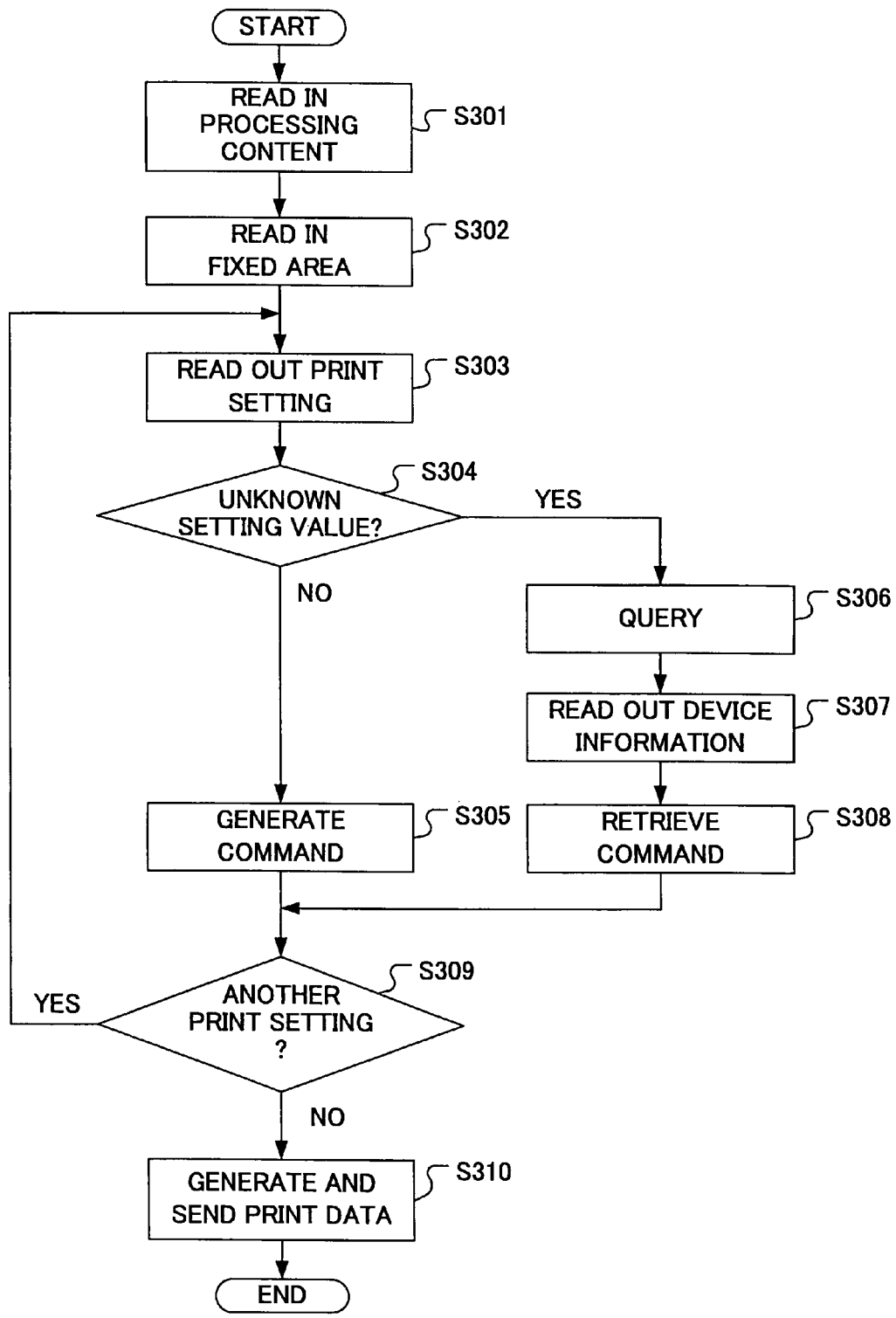
FIG. 11 is a flowchart illustrating an example of a command retrieval operation performed by a printer driver for the processing content in FIG. 10C according to Embodiment 1.

FIG. 11 is a flowchart illustrating an example of a command retrieval operation performed by a printer driver for the processing content having a data structure as shown in FIG. 10C according to the present embodiment.

A user makes a request for printing by a desired printer. Then, in step S301, the processing content reading unit 741 of the print data generating module 432 reads in processing content, which has a data structure as shown in FIG. 10C, stored in the processing content storing unit 731 of the application 410. Then, in step S302, the processing content reading unit 741 extracts and reads in only a fixed area from the read processing content. In step S303, the command retrieving unit 742 reads out the print setting contained in the column 250 of FIG. 10C in the order from the first row of the read fixed area. Then, the command retrieving unit 742 compares the setting values contained in the print setting with the setting values stored in the command memory unit 744 and, in step S304, determines whether the read print setting contains an unknown setting value.

If the print setting is determined not to contain any unknown setting values, the processing goes to step S305, in which the command retrieving unit 742 generates a command corresponding to the print setting.

If the print setting is determined to contain an unknown setting value, the processing goes to step S306, in which the command retrieving unit 742 queries the device information processing module 433 for the unknown setting value. In step S307, the device information processing module 433 reads out the device information (in this embodiment, the device information having a data structure as shown in FIG. 10A) stored in the device information storing unit 712, and extracts from the read device information a command corresponding to the unknown information for which the command retrieving unit 742 queries. Then, in step S308, the device information processing module 433 sends the command to the command retrieving unit 742.

If "512" in the processing content of FIG. 10C as the setting value for the paper type in the print setting is unknown, the command retrieving unit 742 queries the device information processing module 433 for the paper type setting value "512". In response to the query from the command retrieving unit 742, the device information processing module 433 reads out the device information of FIG. 10A stored in the device information storing unit 712. As the "Paper Type" in the device information of FIG. 10A is associated with reference information, the device information processing module 433 further reads out the reference information of FIG. 10B also stored in the device information storing unit 712. It is determined from the reference information of FIG. 10B that the command corresponding to the setting value "512" information storing unit 712, and extracts from the read device information a command corresponding to the unknown information for which the command retrieving unit 742 queries. Then, in step S308, the device information processing module 433 sends the command to the command retrieving unit 742.

If "512" in the processing content of FIG. 10C as the setting value for the paper type in the print setting is unknown, the command retrieving unit 742 queries the device information processing module 433 for the paper type setting value "512". In response to the query from the command retrieving unit 742, the device information processing module 433 reads out the device information of FIG. 10A stored in the device information storing unit 712. As the "Paper Type" in the device information of FIG. 10A is associated with reference information, the device information processing module 433 further reads out the reference information of FIG. 10B also stored in the device information storing unit 712. It is determined from the reference information of FIG. 10B that the command corresponding to the setting value "512" for which the command retrieving unit 742 queries is "SPECIAL3A". The device information processing module 433 returns the command "SPECIAL3A" to the command retrieving unit 742.

In this way, the print data generating module 432 can retrieve a command corresponding to an unknown setting value, i.e., a command corresponding to a newly added option with use of the command retrieving unit 742.

After generation of the command in step S305, or after retrieval of the command in steps S306 through S308, in step S309, the command retrieving unit 742 determines whether the fixed area contains another setting value that is not yet read out.

If the fixed area is determined to contain another setting value that is not yet read out, the processing returns to step S303 for performing a command retrieval operation or a command generation operation.

On the other hand, if the determination result shows that all the setting values in the fixed area are read out and commands corresponding to the setting values are retrieved or generated, the processing goes to step S310. In step S310, the data generating unit 743 generates print data readable by the printer, e.g., PJL (Printer Job Language) section of PDL data by using the commands retrieved or generated by the command retrieving unit 742, and sends the print data to the spooler 440.

In this way, in the case where a printer having a different function from other printers is connected to the computer of this embodiment, the computer stores, as reference information, new information retrieved from the printer in a manner associated with device information that has been stored in the printer driver. Thus, the computer retrieves a command from the reference information, and can generate print data readable by the printer with use of the retrieved command.

Embodiment 2

Figure 12:
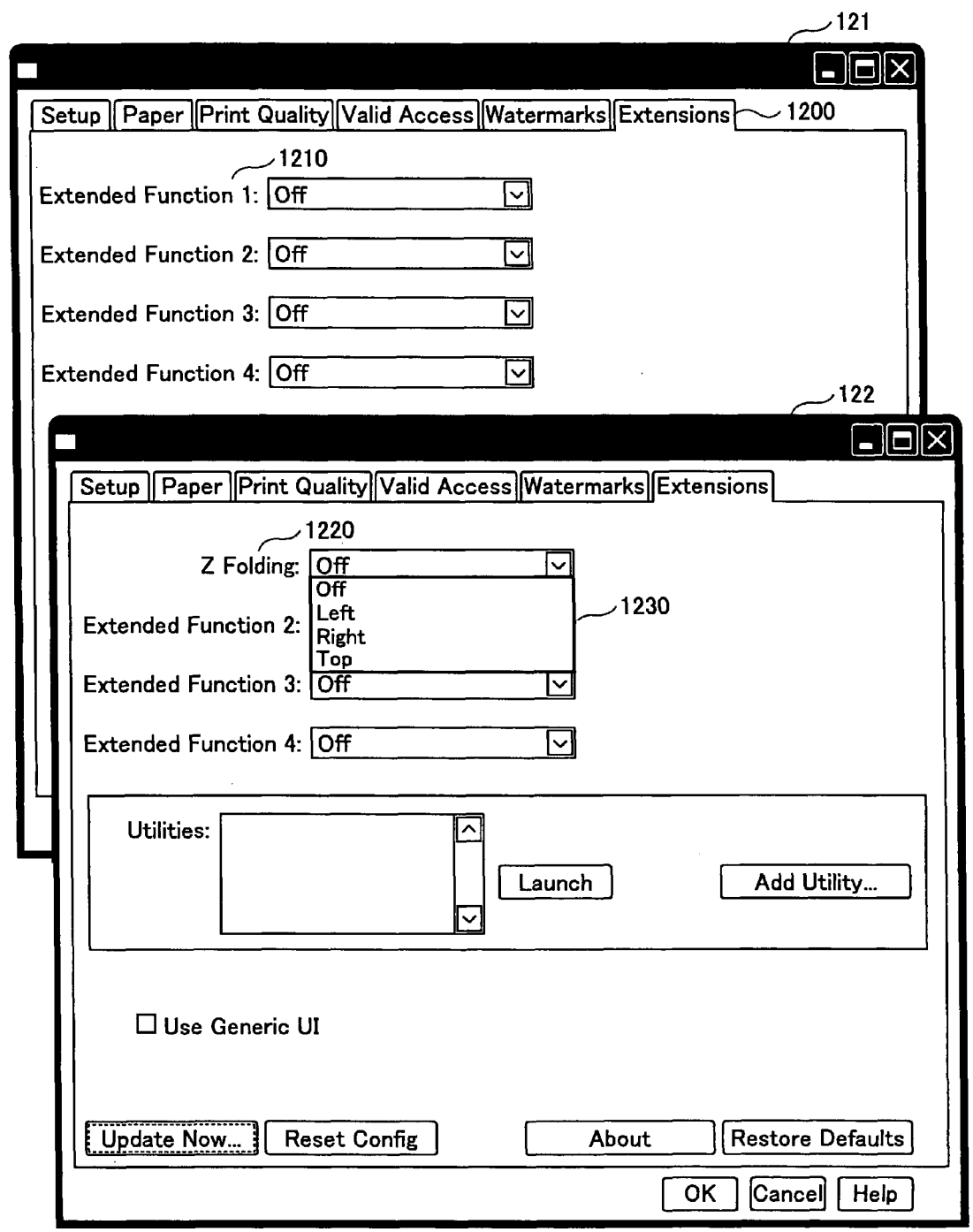
FIG. 12 shows an example of a setting screen for configuring functions of a computer according to Embodiment 2.

[Configuration of Setting Screen]
FIG. 12 shows an example of a setting screen for configuring functions of a computer according to the present embodiment.

The setting screen of FIG. 12 includes a tab page 1200 for configuring extended functions of a printer. If no extended function is added to the printer, a setting screen 121 is shown, in which an area 1210 does not display any name of an extended function to prevent users from specifying the setting of the extended function. On the other hand, if an extended function is added to the printer, a setting screen 122 is shown, in which an area 1220 displays the name of the extended function. Further, an option list 1230 is provided for specifying the setting of the extended function. The user can configure the extended function as in the case of configuring functions that the printer originally has.

In the setting screen 122 of FIG. 12, "Z Folding" is added as the extended function. Further, an option list 1230 including "Off", "Left", "Right", and "Top" is added for specifying the necessity of forming a folding line and the location of the folding line.

The extended function is information that is added, upon retrieval of the new device information from the printer, as new information to the device information already stored in the computer.

Figure 13A:
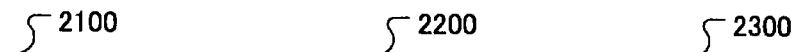
FIG. 13A is a diagram schematically showing an exemplary data structure of device information according to Embodiment 2.

The setting screen of FIG. 12 is generated based on device information of FIG. 13A, first reference information of FIG. 13B associated with the device information, and second reference information of FIG. 13C associated with the first reference information, each of which is in a table data structure. When an extended function is displayed in the area 1220 in the setting screen 122 of FIG. 12, the processing content is represented in a table as shown in FIG. 13D. It is to be noted that the data structures of the device information, the first and second reference information, and the processing content are not limited to the table structures and may be other structures.

[Data Structures of Device Information and Processing Content]
FIG. 13A is a diagram schematically showing an exemplary data structure of device information according to the present invention.

As described with reference to FIGS. 7 and 8, the printer driver 430 compares device information read out from a desired printer with the known device information by using the information comparing unit 713, extracts new information, i.e., additional information about an extended function of the printer contained in the device information read from the printer, and adds the new information to the known device information. The thus updated device information is stored into the device information storing unit 712 in the data structure as shown in FIG. 13A.

The data structure shown in FIG. 13A includes columns 2100, 2200, and 2300. The column 2100 contains the names of functions of the printer, and the column 2200 contains data indicating whether the functions shown in the column 2100 are executable. If the column 2200 contains data indicating that a function is executable and the presence of options for advanced settings for executing the function, the column 2300 contains the options. If the column 2100 includes an extended function, in place of storing information indicating executability of the extended function and options for the extended function, the corresponding row in the columns 2200 and 2300 is associated with the first reference information, which contains the name of the extended function.

FIG. 13B is a diagram schematically showing an exemplary data structure of the first reference information associated with the device information of FIG. 13A.

The data structure shown in FIG. 13B includes columns 2610, 2620, and 2630. The column 2610 contains character strings to be actually displayed on the setting screen. The columns 2620 contains field IDs that indicate predetermined fields in the data structure of the processing content. The column 2630 contains printer readable commands corresponding to the individual options. In the column 2640, the extended function is associated with the second reference information, which indicates options for the extended function.

FIG. 13C is a diagram schematically showing an exemplary data structure of the second reference information associated with the first reference information of FIG. 13B.

The data structure shown in FIG. 13C includes columns 2710, 2720, and 2730. The column 2710 contains character strings to be actually displayed on the setting screen. The column 2720 contains setting values, which are recognizable by the printer driver, corresponding to the individual options. The column 2730 contains commands, which are recognizable by the printer, corresponding to the individual options.

As in the case of the device information, the first and second reference information is also stored into the device information storing unit 712.

As described above with reference to FIGS. 7 and 8, the printer driver 430 displays the setting screen on the display unit 722 based on the device information stored in the device information storing unit 712. If an extended function is added to the printer, the setting screen as shown in FIG. 12 is displayed based on the device information of FIG. 13A, the first reference information of FIG. 13B, and the second reference information of FIG. 13C. In the setting screen 122 of FIG. 12, the function name "Z folding" displayed in the area 1220 corresponds to the character string contained in the column 2610 of the first reference information of FIG. 13B. The options displayed in the option list 1230 correspond to the character strings contained in the column 2710 of the second reference information of FIG. 13C.

FIG. 13D is a diagram schematically showing an exemplary data structure of the processing content based on the device information of FIG. 13A, and the first reference information of FIG. 13B, and the second reference information of FIG. 13C according to the present embodiment.

The data structure shown in FIG. 13D is a DEVMODE structure, and includes columns 2400 and 2500. The data structure of FIG. 13D has a fixed area 200a and an extended area 200b.

The fixed area 200a stores settings of functions that the printer originally has, i.e., original functions of the printer. In the fixed area 200a, the column 2400 contains the names of the original functions; and the column 2500 contains values of the print setting entered on the setting screen by the user, i.e., the values selected by the user from the options in the column 2300 of the device information of FIG. 13A or, if options for a function are added as in the case of Embodiment 1, from the reference information of FIG. 10B.

The extended area 200b stores settings of functions added to the printer, i.e., extended functions of the printer. In the extended area 200b, the column 2400 contains field IDs indicating the locations of the fields in the extended area 200b. The column 2500 contains flags 2510 indicating the presence of the extended functions and a value 2520 of the print setting entered on the setting screen by the user, i.e., a value of the option selected by the user from the second reference information of FIG. 13C.

Assume that, after the device information of FIG. 13A, the first reference information of FIG. 13B, and the second reference information of FIG. 10C are stored, a user specifies the setting of an extended function on the setting screen of FIG. 12 to select an option from the option list 1230. For example, a user selects "Left" from the option list 1230 for the extended function "Z Folding". Since the column 2620 of the first reference information of FIG. 13B contains "5" as a field ID corresponding to the character string "Z Folding", as shown in FIG. 13D, the row in the column 2500 in the extended area 200b of the processing content corresponding to the field ID "5" contains the flag 2510 indicating the presence of the extended function. If the data are expressed in binary, for instance, "1" indicates that the flag is ON and "0" indicates that the flag is OFF. The row in the column 2500 corresponding to the field ID "5" further contains the setting value "1" corresponding to the character string "Left" in the second reference information of FIG. 13C. Then, the processing content having a data structure as shown in FIG. 13D is stored into the application 410.

After that, if a user makes, on the application 410, a request for printing by the printer, the printer driver 430 reads the processing content from the application 410 in order to generate print data readable by the printer. The printer driver 430 examines the read processing content so as to determine whether the read processing content contains unknown information. The printer driver 430 recognizes, as unknown information, the information newly added upon retrieval of the device information from the printer. According to this embodiment, in the extended area 200b of the processing content in FIG. 13D, the field ID "5" of the field where the flag 2510 is ON, i.e., "1" and the setting value "1" are recognized as unknown information.

As described above with reference to FIGS. 7 and 8, the printer driver 430 retrieves, if unknown information is contained in the processing content, a command corresponding to the unknown information from the device information in order to generate print data readable by the printer. The following describes this command retrieval operation in greater detail with reference to the block diagram of FIG. 7 and the flowchart of FIG. 14.

[Command Retrieval and Data Generation]

FIG. 14 is a flowchart illustrating an example of a command retrieval operation performed by a printer driver in the case where the processing content has a data structure as shown in FIG. 13D.

A user makes a request for printing by a desired printer. Then, in step S401, the processing content reading unit 741 of the print data generating module 432 reads processing content, which has a data structure as shown in FIG. 13D, stored in the processing content storing unit 731 of the application 410.

In step S402, the processing content reading unit 741 extracts and reads in the fixed area 200a from the read processing content, and performs command generation and retrieval operations of step S302 through S309 as described with reference to FIG. 11 in Embodiment 1.

After completing the above-described fixed area processing, in step S403, the processing content reading unit 741 extracts and reads in the extended area 200b from the read processing content. In step S404, the command retrieving unit 742 reads out the flags 2510 contained in the column 2500 of FIG. 13D in the order from the first row of the read extended area 200b. Then, in step S405, the command retrieving unit 742 determines whether the flag 2510 is ON (i.e. "1").

If the flag 2510 is determined to be OFF (i.e. "0"), the processing goes to step S410.

On the other hand, if the flag 2510 is determined to be ON (i.e. "1"), the processing goes to step S406, in which the command retrieving unit 742 reads out a field ID and a print setting in the field corresponding to the flag 2510. Then, in step S407, the command retrieving unit 742 queries the device information processing module 433 for the read field ID and the print setting. In step S408, the device information processing module 433 reads out the device information (in this embodiment, the device information having a data structure as shown in FIG. 13A) stored in the device information storing unit 712, and extracts from the read device information commands corresponding to the field ID and the print setting for which the command retrieving unit 742 queries. Then, in step S409, the device information processing module 433 sends the commands to the command retrieving unit 742.

If the flag 2510 in the field of the extended area 200b corresponding to the field ID "5" is "1" and the print setting value 2520 in this field is "1", the command retrieving unit 742 queries the device information processing module 433 for the field ID "5" and the print setting value "1". In response to the query from the command retrieving unit 742, the device information processing module 433 reads out the device information of FIG. 13A stored in the device information storing unit 712. Information about the extended function of the printer in the device information of FIG. 13A is associated with the first reference information. Accordingly, the device information processing module 433 further reads out the first reference information of FIG. 13B also stored in the device information storing unit 712. It is determined from the first reference information of FIG. 13B that the command corresponding to the field ID "5" for which the command retrieving unit 742 queries is "ZFOLDING". Since the command in the first reference information corresponding to the field ID "5" is further associated with the second reference information, the device information processing module 433 further reads out the second reference information of FIG. 13C also stored in the device information storing unit 712. It is determined from the second reference information of FIG. 13C that the command corresponding to the print setting value "1" for which the command retrieving unit 742 queries is "LEFT". Then, the device information processing module 433 returns the commands "ZFOLDING" and "LEFT" to the command retrieving unit 742.

In this way, the print data generating module 432 can retrieve a command corresponding to unknown information, i.e., a command corresponding to a function newly added to the printer with use of the command retrieving unit 742.

If the flag 2510 is determined to be OFF in step S405, or after a command is retrieved in steps S406 through S409, in step S410, the command retrieving unit 742 determines whether the extended area 200b contains another flag 2510 that is not yet read out.

If the extended area 200b is determined to contain another flag 2510 that is not yet read out, the processing returns to step S404 for retrieving a command corresponding to an extended function.

If the determination result shows that all the flags 2510 in the extended area 200b are read out, the processing goes to step S411. In step S411, the data generating unit 743 generates print data readable by the printer, e.g., PJL (Printer Job Language) section of PDL data by using the commands retrieved or generated by the command retrieving unit 742, and sends the print data to the spooler 440.

As is apparent from the above description, if a printer having a different function from other printers is connected to the computer of this embodiment, the computer stores, as first reference information, new information retrieved from the printer in a manner associated with device information that has been stored in the printer driver. The computer also stores, as second reference information, a setting value indicating detailed information of the new information. Thus, the computer retrieves a command corresponding to unknown information from the first reference information and a command corresponding to a setting value of the unknown information, and can generate print data readable by the printer with use of the retrieved commands.

[Modifications]

Although printer drivers are illustrated in the above description, embodiments of the present invention are applicable to various device drivers that convert instructions from an application into data executable by a device, such as scanner drivers and PC-FAX drivers.

The present invention may be embodied not only as a program stored in a hard disk (HD) of an information processing apparatus or a memory unit such as a Read-Only Memory (ROM), but also as hardware in an information processing apparatus.

In an embodiment of the present invention, a computer may retrieve device information at predetermined timings or at asynchronous timings.

The device information may be stored in, e.g., a server as an external storage device.

Embodiments of the present invention are applicable not only to device drivers and modules compatible with device drivers but also to applications themselves.

While the present invention has been described in terms of preferred embodiments, it will be apparent to those skilled in the art that variations and modifications may be made without departing from the scope of the invention.

The present application is based on Japanese Priority Applications No. 2006-152182 filed on May 31, 2006, and No. 2007-113470 filed on Apr. 23, 2007, with the Japanese Patent Office, the entire contents of which are hereby incorporated by reference.

What is claimed is:

1. An information processing apparatus that is connected to a device and generates data processed by the device based on device information about the device, the information processing apparatus comprising:

a device information retrieving unit that retrieves the device information about the device;

a device information storing unit that stores a previously retrieved device information about the device; and an information comparing unit that compares the device information retrieved by the device information retrieving unit and the previously retrieved device information stored in the device information storing unit, wherein, based on a result of the comparison, a new information is extracted from the device information retrieved by the device information retrieving unit, and the extracted information is added to the previously retrieved device information stored in the device information storing unit to update the previously retrieved device information;
a processing content setting unit that specifies, based on the updated device information, a processing content to be executed by the device;
a command retrieving unit that identifies unknown information contained in the processing content specified by the processing content setting unit by comparing the processing content with existing setting information, and retrieves a command corresponding to the unknown information from the updated device information, the unknown information occurring as a result of the updating of the device information; and
a data generating unit that generates, based on the command retrieved by the command retrieving unit and the processing content, data processed by the device.

2. The information processing apparatus as claimed in claim 1, wherein the device information includes reference information, the reference information containing a setting value that represents a setting of a function executable by the device and a command corresponding to the setting value.

3. The information processing apparatus as claimed in claim 2,
wherein the processing content setting unit specifies the processing content to be executed by the device with the setting value; and
the command retrieving unit retrieves, based on the setting value with which the processing content is specified, The command from the reference information.

4. The information processing apparatus as claimed in claim 1,
wherein the device information includes first reference information, the first reference information containing extended function information representing an extended function of the device and an extended function command corresponding to the extended function information; and
the first reference information includes second reference information, the second reference information containing an extended function setting value that represents a setting of the extended function and an extended function setting command corresponding to the extended function setting value.

5. The information processing apparatus as claimed in claim 4,
wherein the processing content setting unit specifies the processing content with the extended function information and the extended function setting value; and
the command retrieving unit retrieves, based on the extended function information and the extended function setting value with which the processing content is specified, the extended function command and the extended function setting command from the first reference information and the second reference information, respectively.

6. The information processing apparatus as claimed in claim 5, wherein the processing content includes a fixed area for containing information about an original function of the device and a setting value that represents a setting of the original function, and an extended area for containing the extended function information and the extended function setting value.

7. The information processing apparatus as claimed in claim 1, further comprising:
a setting screen display unit that displays a setting screen for specifying, based on the device information, the processing content to be executed by the device.

8. The information processing apparatus as claimed in claim 1, further comprising:
a command memory unit that stores a command recognizable by the device in a manner associated with a setting value recognizable by the data generating unit;
wherein the command retrieving unit determines, if the processing content specified by the processing content setting unit contains a setting value that is not stored in the command memory unit, the setting value as being the unknown information.

9. A computer-readable recording medium having a program embodied therein for causing an information processing apparatus, the information processing apparatus being connected to a device and generating data processed by the device based on device information about the device, to function as:
a device information retrieving unit that retrieves the device information about the device;
a device information storing unit that stores a previously retrieved device information about the device; and
an information comparing unit that compares the device information retrieved by the device information retrieving unit and the previously retrieved device information stored in the device information storing unit,
wherein, based on a result of the comparison, a new information is extracted from the device information retrieved by the device information retrieving unit, and the extracted information is added to the previously retrieved device information stored in the device information storing unit to update the previously retrieved device information;
a processing content setting unit that specifies, based on the device information, a processing content to be executed by the device;
a command retrieving unit that identifies unknown information contained in the processing content specified by the processing content setting unit by comparing the processing content with existing setting information, and retrieves a command corresponding to the unknown information from the updated device information, the unknown information occurring as a result of the updating of the device information; and
a data generating unit that generates, based on the command retrieved by the command retrieving unit and the processing content, data processed by the device.

10. The computer-readable recording medium as claimed in claim 9, wherein the device information includes reference information, the reference information containing a setting value that represents a setting of a function executable by the device and a command corresponding to the setting value.

11. The computer-readable recording medium as claimed in claim 10,
wherein the processing content setting unit specifies the processing content to be executed by the device with the setting value; and
the command retrieving unit retrieves, based on the setting value with which the processing content is specified, the command from the reference information.

12. The computer-readable recording medium as claimed in claim 9,
wherein the device information includes first reference information, the first reference information containing extended function information representing an extended function of the device and an extended function command corresponding to the extended function information; and
the first reference information includes second reference information, the second reference information containing an extended function setting value that represents a setting of the extended function and an extended function setting command corresponding to the extended function setting value.

13. The computer-readable recording medium as claimed in claim 12,
wherein the processing content setting unit specifies the processing content with the extended function information and the extended function setting value; and
the command retrieving unit retrieves, based on the extended function information and the extended function setting value with which the processing content is specified, the extended function command and the extended function setting command from the first reference information and the second reference information, respectively.

14. The computer-readable recording medium as claimed in claim 13, wherein the processing content includes a fixed area for containing information about an original function of the device and a setting value that represents a setting of the original function, and an extended area for containing the extended function information and the extended function setting value.

15. The computer-readable recording medium as claimed in claim 9, wherein the program causes the information processing apparatus to further function as a setting screen display unit that displays a setting screen for specifying, based on the device information, the processing content to be executed by the device.

16. The computer-readable recording medium as claimed in claim 9, wherein the command retrieving unit determines, if the processing content specified by the processing content setting unit contains a setting value recognizable by the data generating unit but a command corresponding to which the setting value and recognizable by the device is not retrieved, the setting value as being the unknown information.

17. An information processing system comprising an information processing apparatus, a device, and a storage unit, wherein
the storage unit stores device information about a function that is executed by the device;
the information processing apparatus includes:
a device information retrieving unit that retrieves the device information about the function executable by the device from the storage device;
a device information storing unit that stores a previously retrieved device information about the function executable by the device; and
an information comparing unit that compares the device information retrieved by the device information retrieving unit and the previously retrieved device information stored in the device information storing unit,
wherein, based on a result of the comparison, a new information is extracted from the device information retrieved by the device information retrieving unit, and the extracted information is added to the previously retrieved device information stored in the device information storing unit to update the previously retrieved device information;
a processing content setting unit that specifies, based on the device information, a processing content to be executed by the device;
a command retrieving unit that identifies unknown information contained in the processing content specified by the processing content setting unit by comparing the processing content with existing setting information, and retrieves a command corresponding to the unknown information from the updated device information, the unknown information occurring as a result of the updating of the device information;
a data generating unit that generates, based on the command retrieved by the command retrieving unit and the processing content, data processed by the device; and
a data sending unit that sends the data generated by the data generating unit to the device; and
the device includes:
a data receiving unit that receives data sent from the information processing apparatus; and
a data processing unit that processes data received by the data receiving unit.

* * * * *